Figure 1:
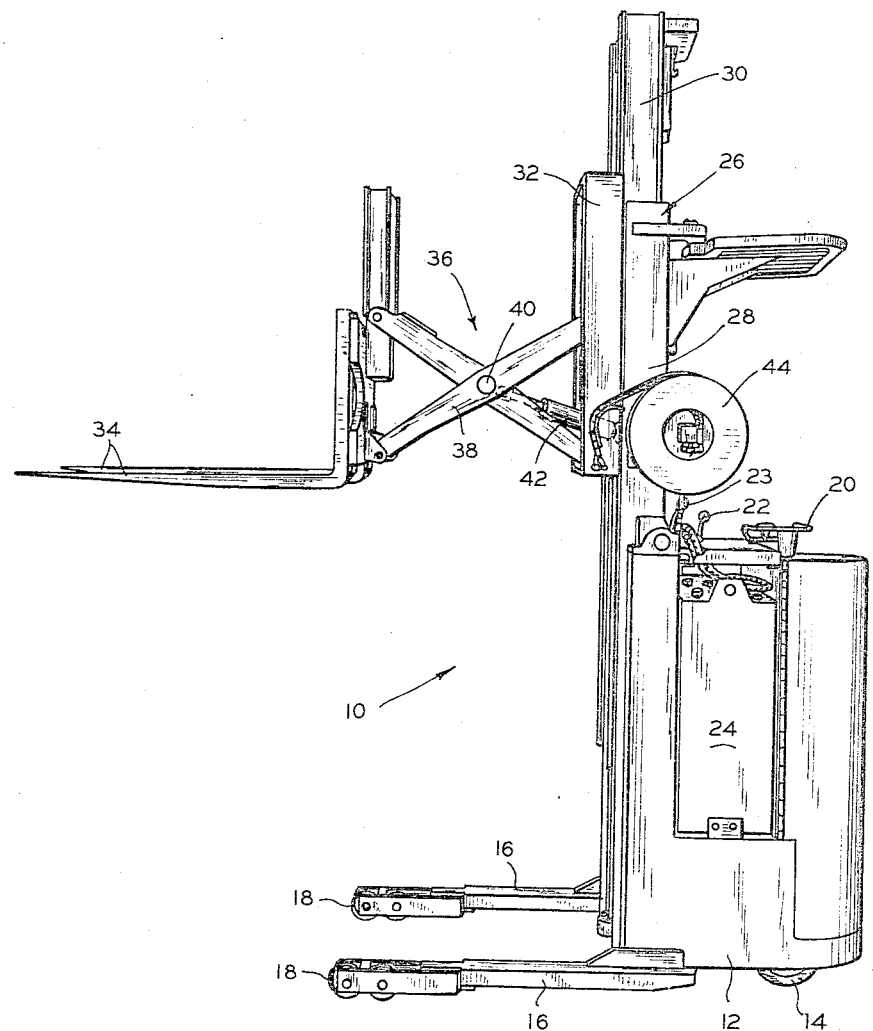

April 11, 1967  H. J. THOMAS  3,313,316
RELIEF AND ANTI-CAVITATION VALVE ASSEMBLY
Filed June 1, 1964  2 Sheets-Sheet 1

FIG. I

INVENTOR
HENRY J. THOMAS
BY
Kenneth C. Witt
ATTORNEY

United States Patent Office 3,313,316
Patented Apr. 11, 1967

3,313,316
RELIEF AND ANTI-CAVITATION VALVE
ASSEMBLY
Henry J. Thomas, Battle Creek, Mich., assignor to Clark
Equipment Company, a corporation of Michigan
Filed June 1, 1964, Ser. No. 371,283
2 Claims. (Cl. 137—596)

This invention relates to valves, and more specifically to a relief and anti-cavitation valve assembly. The valve assembly is described and illustrated herein for use with an industrial lift truck having a scissors mechanism for extending the load engaging apparatus, but it will be readily understood that the valve assembly is not limited to such use and can be employed in many other applications also.

In some lift trucks the load engaging apparatus is connected to the lift upright by means of a scissors mechanism so that the load engaging apparatus may be extended forwardly or retracted relative to the lift upright. In order to actuate the scissors mechanism it is advantageous to use one or more double-acting piston and cylinder type fluid motors.

In the event that the lift truck is operated so as to forcibly bring the load engaging apparatus into abutment with a wall, for example, while the load engaging apparatus is partially extended, damage may result to the hydraulic circuit for actuating the scissors mechanism due to excessive fluid pressure generated by bringing the load engaging apparatus into forceful abutment with the wall.

It is an object of the present invention to provide a valve assembly for relieving excessive pressure in the hydraulic circuit associated with the scissors mechanism.

Another problem associated with forcibly running the load engaging apparatus into a wall is that should any significant amount of fluid be forced out of the head end of the cylinder which actuates the scissors mechanism an unstable condition may accrue from the resulting vacuum or cavitation since the piston in the fluid motor will no longer be hydraulically locked between two bodies of fluid.

A further object of my invention is to provide a valve assembly which prevents cavitation of the fluid motors associated therewith.

In carrying out my invention in a preferred embodiment thereof, I provide in conjunction with an open center four-way valve having a pair of fluid motor ports connected thereto by a pair of fluid passages, a cross bore connecting the pair of fluid passages, a pair of dual valve assemblies disposed respectively at opposite ends of the cross bore and a pressure relief valve communicating with the cross bore between the two dual valve assemblies. Each dual valve assembly is operable to permit fluid flow from the adjacent fluid passage into the cross bore when a predetermined pressure is reached in the adjacent fluid passage and to permit fluid flow from the cross bore into the adjacent fluid passage when a predetermined pressure is reached in the cross bore and which is higher than the fluid pressure in the adjacent fluid passage.

Figure 2:
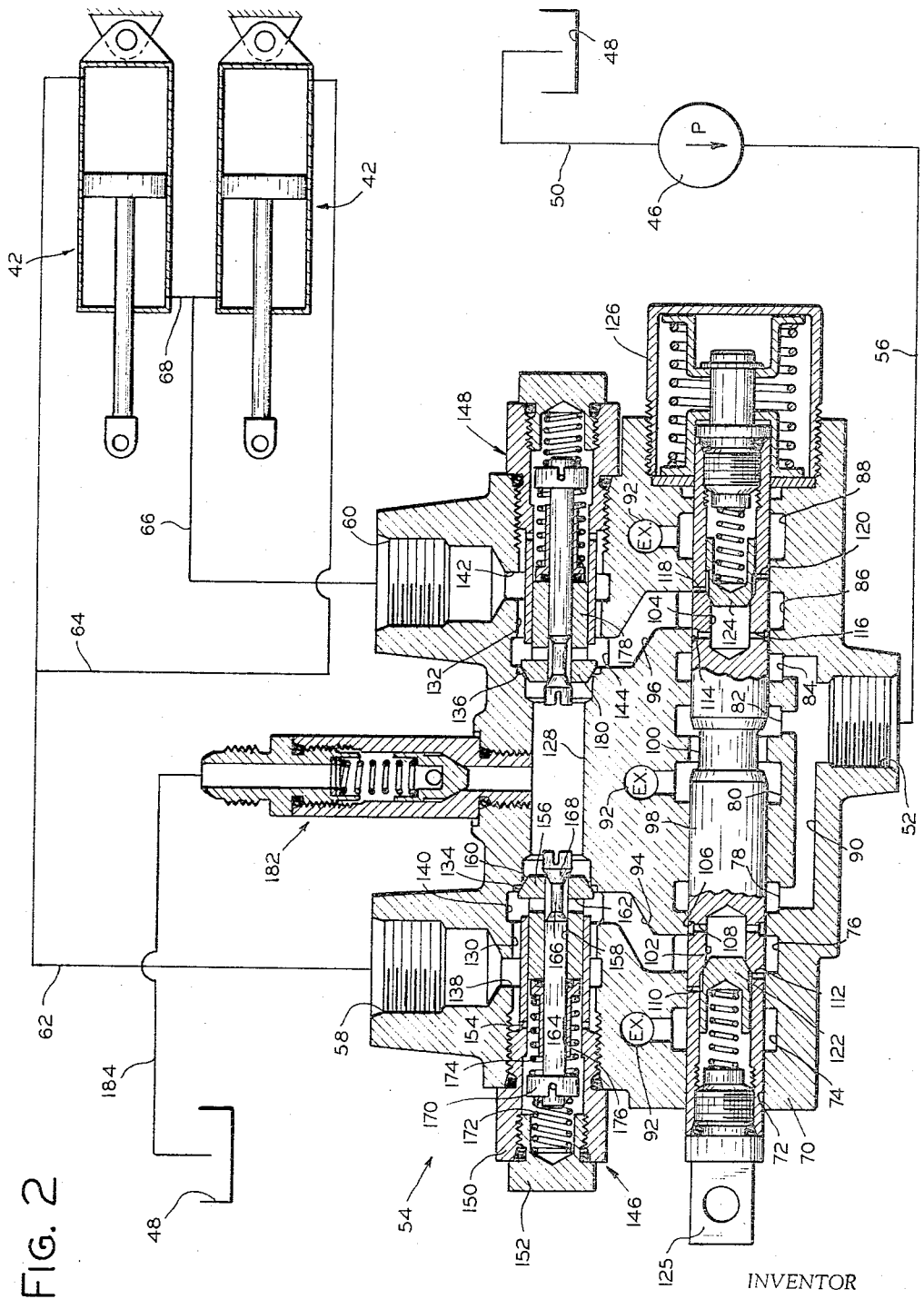

The above and other objects, features and advantages of my invention will become more readily apparent to one skilled in the art when the following detailed description is taken in conjunction with the accompanying drawing wherein:

FIGURE 1 shows a perspective view of an industrial lift truck embodying my invention and FIGURE 2 is a section of my novel valve assembly together with the associated fluid circuitry.

Referring now to FIG. 1, the lift truck which is indicated generally by reference numeral 10 will be briefly described in order to provide sufficient background for understanding the description and operation of my novel valve assembly. Lift truck 10 is an electric rider type and includes a body 12 which is supported by means of a drive steer wheel 14 and a caster wheel (not shown) at one end thereof and at the other end by means of a pair of outriggers 16 at the end of which a pair of tandem trail wheels 18 are rotatably mounted. An operator's station is provided at the far rear corner of body 12, but is not visible in the present view. Conveniently located to the operator's station is a steering control wheel 20 and various control levers including a speed and direction control lever 22 and a lever 23 for actuating the scissors mechanism to extend or retract the load engaging member. Forwardly of the operator's station a recess is provided in body 12 in which a battery 24 is located and which provides the electrical power with which to operate truck 10. At the forward end of body 12 a lift upright 26 is mounted.

Lift upright 26 includes a non-elevatable mast member 28 within which an elevatable mast member or inner slide 30 is telescopically disposed. A carriage member 32 is connected to inner slide 30 for vertical movement therealong. Carriage member 32 and inner slide 30 are connected to a hydraulic ram, not shown, by means of a sprocket and chain arrangement so that extension of the ram causes a coordinated elevation of carriage member 32 and inner slide 30.

A load engaging means or member which in the present case comprises a pair of fork arms or tines 34 is connected to carriage member 32 by means of a scissors mechanism 36. Scissors mechanism 36 includes two pairs of cross-arms 38, each pair being connected intermediate the ends of the arms by means of a pin 40, pivotally connected at their bottom ends to the fork arms 34 and carriage member 32, respectively, and connected adjacent their upper ends to fork arms 34 and carriage member 32, respectively, by means of roller and channel mechanism for sliding movement.

Scissors mechanism 36 is actuated by means of a pair of double-acting piston and cylinder type fluid motors 42 which are connected at one end thereof to cross arms 38 adjacent pin 40 and connected at the other end thereof to carriage member 32. Hydraulic hoses for carrying fluid to and from motors 42 are wound on a take-up reel 44 which is mounted on mast member 28.

Referring now also to FIG. 2, the valve assembly and hydraulic circuit for controlling fluid motors 42 will be described. A fluid pump 46 serves to draw fluid from a reservoir or sump 48 via a fluid conduit 50 and supply pressurized fluid to the inlet port 52 of a valve assembly 54 via a fluid conduit 56. From inlet port 52 the pressurized fluid may be returned directly to sump 48 or directed first to one or the other of fluid motor ports 58 and 60 to extend or retract fluid motors 42, as desired. The head ends of fluid motors 42 are connected in parallel with fluid motor port 58 by means of a pair of fluid conduits 62 and 64, while the rod ends of fluid motors 42 are connected in parallel with fluid motor port 60 by means of a fluid conduit 66 and a cross conduit 68.

Valve assembly 54 includes a valve body 70 through which a bore 72 extends. Located in the wall of bore 72 are eight spaced-apart annular grooves 74, 76, 78, 80, 82, 84, 86 and 88. Grooves 78, 82 and 84 are connected to inlet port 52 by means of a manifold fluid passage 90. Annular grooves 74, 80 and 88 are connected with exhaust passages 92 which in turn communicate with fluid sump 48. Annular groove 78 is connected with fluid motor port 58 by fluid passage means which includes a fluid passage 94. Similarly, annular groove 86 is connected with fluid motor port 60 by fluid passage means including a fluid passage 96.

Slidably disposed in bore 72 is a valve spool 98. Spool 98 includes a centrally located annular groove 100 in the outer periphery thereof which is disposed to partially overlap annular grooves 80 and 82, as shown in FIG. 2. Extending inwardly from opposite ends of spool 98 is a pair of bores 102 and 104. Bore 102 is connected adjacent the bottom thereof with an annular groove 106 in the surface of spool 98 by means of a plurality of radially extending fluid passages 108. Also, a plurality of fluid passages 110 and 112 extend between the surface of spool 98 and bore 102, passages 110 being disposed to communicate with groove 74 and passages 112 being disposed to communicate with groove 76, depending upon the direction in which spool 98 is shifted away from the centered position. Similarly, bore 104 is connected with an annular groove 114 by means of fluid passages 116. Also, fluid passages 118 and 120 extend between bore 104 and the surface of spool 98. At this point it will be appreciated that bore 72 and spool 98 cooperate to provide a four-way open center valve. That is, when spool 98 is in the centered position, as shown in FIG. 2, the pressurized fluid supplied to inlet port 52 is directed with substantially unrestricted flow from groove 82 to groove 80 and hence back to sump 48 via exhaust passage 92. By shifting spool 98 toward the left, as viewed in FIG. 2, fluid flow from groove 82 to groove 80 may be restricted or completely shut off while at the same time grooves 84 and 86 are placed in communication with each other by the fluid passages and bore in the right end of spool 98 and at the same time grooves 76 and 74 are placed in communication with each other by the fluid passages and bore in the left end of spool 98. Thus, pressurized fluid is directed to fluid motor port 60 while fluid motor port 58 is placed in communication with sump 48. Conversely, shifting of spool 98 to the right will direct pressurized fluid to fluid motor port 58 while placing fluid motor port 60 in communication with sump 48.

A pair of spring loaded one-way check valves 122 and 124 are disposed in bores 102 and 104, respectively. Check valve 122 functions to permit fluid flow only in the direction from fluid passages 108 toward fluid passages 110 and 112, and then only when a predetermined fluid pressure is reached. Check valve 124 functions in a similar manner to check valve 122 and permits fluid flow only in the direction from fluid passages 116 toward fluid passages 118 and 120 only when a predetermined fluid pressure is reached. In the event that a force is being exerted on fluid motors 42 by a load on fork arms 34 so that a fluid back pressure is created in fluid passage 96 check valve 124 will prevent fluid from being forced backwards through conduit 96 by the back pressure exerted thereon when spool 98 is shifted and the pressure of the fluid supply to inlet port 52 is not as high as the pressure of the fluid in fluid passage 96 caused by the load on fork arms 34.

Spool 98 is provided with suitable means 125 for connection to control lever 23 and is connected at the opposite end thereof to a centering spring assembly 126 which is of conventional construction and serves to return spool 98 to the centered position shown in FIG. 2 whenever spool 98 is shifted in either direction away from the centered position.

A cross bore 128 extends through valve body 70 and includes a pair of counterbored portions 130 and 132. Counterbore 130 defines with bore 128 a shoulder 134 and counterbore 132 defines with bore 128 a shoulder 136. Located in counterbore 130 is a pair of annular grooves 138 and 140. Groove 138 connects counterbore 130 with fluid motor port 58 and groove 140 connects counterbore 130 with fluid passage 94. Likewise, a pair if annular grooves 142 anl 144 are located in counterbore 132 and serve respectively to connect fluid motor port 60 and fluid passage 96 with counterbore 132. Thus, annular groove 76, fluid passage 94, annular groove 140, counterbore 130 and annular groove 138 provide fluid passage means between bore 72 and fluid motor port 58. In a similar manner, annular groove 86, fluid passage 96, annular groove 144, counterbore 132 and annular groove 142 provide fluid passage means between bore 72 and fluid motor port 60.

Disposed respectively in counterbores 130 and 132 is a pair of dual valve assemblies 146 and 148. These dual valve assemblies serve, as will be seen, to permit a cross flow of fluid between fluid motor ports 58 and 60 under certain operating conditions.

Dual valve assembly 146 includes an elongated tubular member 150 which is partially disposed in counterbore 130 and threadably engages valve housing 70. The outer end of tubular member 150 is closed by means of a threaded cap 152. A plurality of radially extending fluid passages 154 extend through the wall of tubular member 150 and connect the inner and outer surfaces thereof. Partially telescoped within tubular member 150 for sliding movement therein is an outer movable valve member 156 through which a bore 158 extends longitudinally thereof. Valve member 156 has a tapered end surface 160 which is actuatable into sealing abutment with shoulder 134 and a plurality of radially extending fluid passages 162 which connect bore 158 with the outer surface of valve member 156. Slidably disposed in bore 158 is an inner movable valve member 164. Valve member 164 has a reduced portion 166 which provides fluid passage means through bore 158 between fluid passages 162 and the end of bore 158. Also, valve member 164 includes an enlarged tapered head portion 168 which can be actuated into sealing abutment with the edge of bore 158 adjacent thereto. Secured to valve member 164 adjacent the end opposite enlarged head portion 168 is a collar 170. Disposed between collar 170 and cap 152 is an helical compression spring 172 and disposed between collar 170 and valve member 156 is an helical compression spring 174. Spring 174 serves to bias head portion 168 and the edge of bore 158 into sealing abutment with each other, and tends to cause valve member 156 to move with valve member 164. Spring 172 tends to bias valve member 164 toward the right, as shown in FIG. 2, and thus actuate tapered end portion 160 of valve member 156 into sealing abutment with shoulder 134 since spring 174 causes valve members 156 and 164 to move as a unit. Disposed between collar 170 and valve member 156 is an annular spacer member 176 which serves to limit the relative movement between valve members 156 and 164.

Dual valve assembly 148 is identical with the previously described dual valve assembly 146, and so will not be described in detail except to note that dual valve assembly 148 includes an outer movable valve member 178 having a tapered end portion 180 which is actuatable into sealing abutment with shoulder 136.

Threadably secured to valve body 70 and communicating with bore 128 intermediate dual valve assemblies 146 and 148 is a conventional fluid pressure relief valve 182. Relief valve 182 is spring loaded and is set to open at a predetermined fluid pressure which is greater than the fluid pressure that would move either valve member 156 or valve member 178 away from sealing abutment with shoulders 134 or 136, respectively. The downstream side of relief valve 182 is connected with sump 48 by means of a fluid conduit 184.

Although not described in detail, it will be understood that O-rings are provided throughout valve assembly 54 in order to provide fluid seals wherever required.

Turning now to the operation of my invention, it will be assumed that fork arms 34 are disposed adjacent carriage member 32 and that the operator wishes to extend them forwardy by actuating scissors mechanism 36. In order to accomplish the desired extension of fork arms 34 the operator must actuate hand control lever 23 adjacent the operator's station to move spool 98 toward the right, as shown in FIG. 2, so that pressurized fluid supplied inlet port 52 is directed to fluid motor port 58 and hence to the head ends of fluid motors 42. At the same time, spool 98 also causes fluid motor port 60 to be connected with exhaust passages 92 and hence sump 48. With spool 98 shifted to the right fluid motors 42 are actuated to extend with the result that scissors mechanism 36 is actuated to cause fork arms 34 to extend to the position shown in FIG. 1, for example. Movement of spool 98 toward the left will cause pressurized fluid to be supplied to inlet port 52 to be directed to fluid motor port 60 and hence to the rod ends of fluid motors 42, thereby causing fluid motors to retract. Thus, if the operator desires to retract fork arms 34 from the position shown in FIG. 1, he will actuate control level 23 to cause spool 98 to be moved toward the left, as shown in FIG. 2, whereby hydraulic motors 42 are caused to retract. Now, should the operator run the fork arms 34 into a wall, for example, while traveling forwardly with them in the extended position shown in FIG. 1, fluid pressure will be generated in the head ends of fluid motors 42. This fluid presure will be transmitted back along conduits 62 and 64 to fluid motor port 58 and through fluid passages 154 to act on the end of valve member 164 which is located adjacent cap 152 with the result that a force is applied to valve member 164 which causes it to move toward the right. Thus, head portion 168 is moved away from sealing abutment with the adjacent end of bore 158. When this occurs fluid may then flow from fluid motor port 158 through counterbore 130, fluid passages 162, bore 158 and into bore 128. The fluid pressure which then builds up in bore 128 acts on the tapered end portion 180 of valve member 178 to move it away from sealing abutment with shoulder 136, whereby fluid may then flow through counterbore 136 to fluid motor port 60 and hence to the rod ends of fluid motors 42 via conduits 66 and 68. Thus, a portion of the fluid forced out of the head ends of fluid motors 42 is transferred to the rod ends thereof. However, since more fluid will be displaced out of the head ends of fluid motors 42 than can be received in the rod ends of fluid motors 42, due to the displacement of the rods, provision must be made for the excess amount of fluid that cannot be transferred into the rod ends of fluid motors 42. Relief valve 182 serves this purpose. It is set to open at a higher pressure than valve member 178, for example, so that the fluid from the head end of fluid motors 42 is initially directed to the rod ends thereof and any excess is let off through relief valve 182, whereby excessive pressures and cavitation are prevented. It will be appreciated that because valve assembly 54 is symmetric from a functional standpoint that it will operate in the same manner whether high back pressures are applied to port 58 or 60.

Although only a single preferred embodiment of my invention has been disclosed, it is to be understood that the above description is intended to be illustrative only, and that my invention is subjected to various modifications and changes which nonetheless remain in the scope of my invention. Consequently, the scope of my invention should be determined from the following appended claims taken in conjunction with the prior art.

I claim:

1. For use with a valve body having a bore with a shoulder in the wall thereof and fluid passage means intersecting the bore, a dual valve assembly comprising a first valve member having a first bore extending partially therethrough from one end thereof, the said valve member being securable to the valve body so that the open end of the said first bore is disposed in the bore adjacent the shoulder, a second valve member having a second bore extending completely therethrough, the said second valve member being partially telescoped in the said first bore for sliding movement therein and actuatable into fluid sealing abutment with the shoulder, first fluid passage means in the said second valve member for connecting the fluid passage means with the said second bore, second fluid passage means in the said first valve member for connecting the said first bore intermediate the bottom thereof and the said second valve member with the bore, a third valve member slidably disposed in the second bore and extending beyond the ends thereof, the said third valve member having an enlarged end portion larger than the adjacent end of the said second bore and actuatable into fluid sealing abutment with the said adjacent end and a reduced portion which serves to provide fluid passage means through the said second bore between the said first fluid passage means and the said adjacent end of the said second bore, a spring retaining member fixed to the said third valve member adjacent the end opposite the said enlarged end portion, spring means disposed between the said retainer member and the said second valve member for biasing the said enlarged end portion of the said third valve member and the said adjacent end of the said second bore into fluid sealing abutment with each other, and spring means disposed between the said retainer member and the said bottom of the said first bore for biasing the said second valve member into fluid sealing abutment with the shoulder.

2. A valve assembly comprising a valve body having fluid supply and exhaust means and a pair of fluid motor ports, a valve spool disposed in the said body, a pair of fluid passage means located in the said body for connecting the said ports with the said valve spool, the said valve spool being operable to connect the said supply means with one of the said ports while connecting the other port with the said exhaust means and vice versa, a cross bore located in the said body and connecting the said pair of fluid passage means, the said cross bore having a pair of shoulders in the wall thereof, a pair of dual valve assemblies disposed at least partially within the said cross bore adjacent the said shoulders, each dual valve assembly including a first valve member having a first bore extending partially therethrough from one end thereof, the said first valve member being securable to the said valve body so that the open end of the said first bore is disposed in the said cross bore adjacent one of the said shoulders, a second valve member having a second bore extending completely therethrough, the said second valve member being partially telescoped in the said first bore for sliding movement therein and actuatable into fluid sealing abutment with the said one shoulder, first fluid passage means in the said second valve member for connecting one of the said pairs of fluid passage means with the said second bore, second fluid passage means in the said first valve member for connecting the said first bore intermediate the bottom thereof and the said second valve member with the said cross bore, a third valve member slidably disposed in the said second bore and extending beyond the ends thereof, the said third valve member having an enlarged end portion larger than the adjacent end of the said second bore and actuatable into fluid sealing abutment with the said adjacent end and a reduced portion which serves to provide fluid passage means through the said second bore between the said first fluid passage means and the said adjacent end of the said second bore, a spring retaining member fixed to the said third valve member adjacent the end opposite the said enlarged end portion, spring means disposed between the said retainer member and the said second valve member for biasing the said enlarged end portion of the said third valve member and the said adjacent end of the said second bore into fluid sealing abutment with each other, and spring means disposed between the said retainer member and the said bottom of the said first bore for biasing the said second valve member into fluid sealing abutment with the said one shoulder.

References Cited by the Examiner

UNITED STATES PATENTS

| | | | |
|---|---|---|---|
| 2,393,589 | 1/1946 | Compton et al. | 137—493.4 |
| 2,499,425 | 3/1950 | Stephens | 137—596.12 |
| 2,954,011 | 9/1960 | Krehbiel | 137—612.1 XR |
| 3,049,101 | 8/1962 | Ruhl | 91—420 |
| 3,112,763 | 12/1963 | Tennis et al. | 137—493.5 |
| 3,213,762 | 10/1965 | Dubuf | 91—451 |

M. CARY NELSON, *Primary Examiner.*

HENRY KLINKSIEK, *Assistant Examiner.*